US009015368B2

(12) United States Patent
Christison et al.

(10) Patent No.: US 9,015,368 B2
(45) Date of Patent: Apr. 21, 2015

(54) ENHANCED WIRELESS USB PROTOCOL

(75) Inventors: Gregory L. Christison, Fairview, TX (US); Brian R. Doherty, Allen, TX (US); Tom Miller, Plano, TX (US); Anoop Nair, Allen, TX (US); Sidney B. Schrum, Fairview, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/963,427

(22) Filed: Dec. 21, 2007

(65) Prior Publication Data

US 2008/0215773 A1 Sep. 4, 2008

Related U.S. Application Data

(60) Provisional application No. 60/871,527, filed on Dec. 22, 2006.

(51) Int. Cl.
*G06F 13/00* (2006.01)
*H04W 28/06* (2009.01)
*G06F 13/38* (2006.01)

(52) U.S. Cl.
CPC .............. *H04W 28/06* (2013.01); *G06F 13/387* (2013.01); *G06F 2213/3814* (2013.01)

(58) Field of Classification Search
USPC .......................................................... 710/35
See application file for complete search history.

(56) References Cited

U.S. PATENT DOCUMENTS

| 5,970,069 | A * | 10/1999 | Kumar et al. ................. 370/402 |
| 6,633,583 | B1 * | 10/2003 | Esterson ....................... 370/466 |
| 6,674,731 | B1 * | 1/2004 | Bradshaw et al. ............ 370/316 |
| 6,725,302 | B1 | 4/2004 | Benayoun et al. |
| 6,842,797 | B1 * | 1/2005 | Lawande ........................ 710/35 |
| 6,944,687 | B2 | 9/2005 | Doragh et al. |
| 6,959,355 | B2 | 10/2005 | Szabelski |
| 7,028,114 | B1 | 4/2006 | Milan et al. |
| 7,526,590 | B2 * | 4/2009 | Ismail et al. .................. 710/112 |
| 7,565,467 | B2 * | 7/2009 | Nagase ............................ 710/62 |
| 8,078,805 | B1 * | 12/2011 | Smirnov et al. .............. 711/137 |
| 2002/0101842 | A1 * | 8/2002 | Harrison et al. ............... 370/338 |
| 2003/0018403 | A1 * | 1/2003 | Braun et al. .................... 700/45 |
| 2003/0043771 | A1 | 3/2003 | Mizutani et al. |
| 2003/0152059 | A1 * | 8/2003 | Odman ........................ 370/338 |
| 2003/0200372 | A1 * | 10/2003 | Doragh et al. ................ 710/305 |

(Continued)

FOREIGN PATENT DOCUMENTS

| CN | 1311570 A | 9/2001 |
| JP | H11112524 A | 4/1999 |

(Continued)

OTHER PUBLICATIONS

Agere Systems, Inc. et al., "Wireless Universal Serial Bus Specification", revision 1.0, dated May 12, 2005. Pertinent pp. 85, 102, 103, 110, 195, 198-200, 212, 227-229, 234, 235, 253.*

(Continued)

*Primary Examiner* — Henry Tsai
*Assistant Examiner* — Christopher Bartels
(74) *Attorney, Agent, or Firm* — Nicholas J. Pauley; Peter Michael Kamarchik; Joseph Agusta

(57) ABSTRACT

The present invention provides a method for increasing data throughput for a wireless USB system that includes wire adapters that wirelessly transmit data between a host system and a USB enabled device.

28 Claims, 14 Drawing Sheets

(56) References Cited

U.S. PATENT DOCUMENTS

| | | | |
|---|---|---|---|
| 2003/0214967 A1* | 11/2003 | Heberling | 370/437 |
| 2004/0117513 A1* | 6/2004 | Scott | 710/1 |
| 2004/0203415 A1 | 10/2004 | Wu | |
| 2004/0229606 A1* | 11/2004 | Oshima et al. | 455/426.2 |
| 2004/0246974 A1* | 12/2004 | Gyugyi et al. | 370/395.31 |
| 2004/0259589 A1* | 12/2004 | Bahl et al. | 455/553.1 |
| 2005/0002391 A1 | 1/2005 | Matsuda et al. | |
| 2005/0027910 A1 | 2/2005 | Barrett, Jr. et al. | |
| 2005/0048997 A1* | 3/2005 | Grobler et al. | 455/550.1 |
| 2005/0198413 A1* | 9/2005 | Moyer | 710/35 |
| 2005/0237964 A1* | 10/2005 | Kupershmidt | 370/321 |
| 2005/0259617 A1* | 11/2005 | Wason et al. | 370/329 |
| 2005/0278472 A1 | 12/2005 | Gierke | |
| 2005/0286544 A1* | 12/2005 | Kitchin et al. | 370/412 |
| 2006/0023749 A1* | 2/2006 | Yoshizawa et al. | 370/470 |
| 2006/0048196 A1* | 3/2006 | Yau | 725/81 |
| 2006/0056443 A1* | 3/2006 | Tao et al. | 370/462 |
| 2006/0061963 A1* | 3/2006 | Schrum | 361/686 |
| 2006/0073788 A1 | 4/2006 | Halkka et al. | |
| 2006/0080481 A1* | 4/2006 | Woodings et al. | 710/36 |
| 2006/0104238 A1 | 5/2006 | Hibino | |
| 2006/0116853 A1* | 6/2006 | Rappaport et al. | 702/182 |
| 2006/0123181 A1* | 6/2006 | Aull et al. | 710/310 |
| 2006/0126617 A1* | 6/2006 | Cregg et al. | 370/389 |
| 2006/0143330 A1* | 6/2006 | Kiehl | 710/35 |
| 2006/0166621 A1* | 7/2006 | Bae et al. | 455/41.2 |
| 2006/0179144 A1* | 8/2006 | Nagase | 709/226 |
| 2006/0215574 A1 | 9/2006 | Padmanadhan et al. | |
| 2006/0215593 A1* | 9/2006 | Wang et al. | 370/315 |
| 2006/0218315 A1* | 9/2006 | Okajima et al. | 710/35 |
| 2006/0239272 A1* | 10/2006 | Heidari-Bateni et al. | 370/395.21 |
| 2006/0242304 A1* | 10/2006 | Hirose et al. | 709/227 |
| 2006/0285502 A1* | 12/2006 | Bigioi et al. | 370/254 |
| 2007/0030854 A1* | 2/2007 | Lin et al. | 370/401 |
| 2007/0038784 A1* | 2/2007 | Sung et al. | 710/56 |
| 2007/0066314 A1* | 3/2007 | Sherman et al. | 455/445 |
| 2007/0071034 A1* | 3/2007 | Fleming | 370/474 |
| 2007/0073935 A1* | 3/2007 | Kim et al. | 710/62 |
| 2007/0081486 A1* | 4/2007 | Koide | 370/328 |
| 2007/0147236 A1* | 6/2007 | Lee | 370/229 |
| 2007/0204076 A1* | 8/2007 | Arulambalam et al. | 710/35 |
| 2007/0230500 A1* | 10/2007 | Spenik et al. | 370/465 |
| 2007/0239929 A1* | 10/2007 | Chen et al. | 711/103 |
| 2007/0263629 A1* | 11/2007 | Cornett et al. | 370/392 |
| 2007/0286416 A1 | 12/2007 | Bertoni et al. | |
| 2007/0294456 A1* | 12/2007 | Chan et al. | 710/313 |
| 2007/0300004 A1* | 12/2007 | Yun | 710/313 |
| 2008/0005262 A1* | 1/2008 | Wurzburg et al. | 709/217 |
| 2008/0005395 A1* | 1/2008 | Ong et al. | 710/36 |
| 2008/0025329 A1* | 1/2008 | Livet et al. | 370/406 |
| 2008/0062919 A1* | 3/2008 | Chen et al. | 370/329 |
| 2008/0069026 A1* | 3/2008 | Chan et al. | 370/315 |
| 2008/0183920 A1* | 7/2008 | Jiang et al. | 710/53 |
| 2008/0219176 A1* | 9/2008 | Yamada | 370/252 |
| 2008/0228962 A1* | 9/2008 | Ong | 710/35 |
| 2009/0006676 A1* | 1/2009 | Sampat et al. | 710/62 |
| 2009/0172216 A1* | 7/2009 | Luedeke et al. | 710/35 |
| 2009/0323723 A1* | 12/2009 | Tominaga | 370/474 |
| 2010/0205334 A1* | 8/2010 | Tominaga | 710/65 |
| 2010/0325326 A1* | 12/2010 | Huang et al. | 710/110 |
| 2012/0072628 A1* | 3/2012 | Crockett et al. | 710/110 |

FOREIGN PATENT DOCUMENTS

| | | |
|---|---|---|
| JP | 2000269961 A | 9/2000 |
| JP | 2001156797 A | 6/2001 |
| JP | 2003234796 A | 8/2003 |
| JP | 2003316729 A | 11/2003 |
| JP | 2004533184 A | 10/2004 |
| JP | 2004362544 A | 12/2004 |
| JP | 2005044094 A | 2/2005 |
| JP | 2006148311 A | 6/2006 |
| JP | 2006238413 A | 9/2006 |
| JP | 2006243866 A | 9/2006 |
| JP | 2007608775 | 4/2007 |
| JP | 2008048179 A | 2/2008 |
| RU | 2243589 C1 | 12/2004 |
| RU | 2004110228 | 3/2005 |
| TW | 413763 | 12/2000 |
| WO | 02101513 A2 | 12/2002 |
| WO | WO03023587 A2 | 3/2003 |

OTHER PUBLICATIONS

Compaq Computer Corporation et al., "Universal Serial Bus Specification", Revision 2.0, dated Apr. 27, 2000.

Agere Systems Inc. et al., "Wireless Universal Serial Bus Specification", revision 1.0, dated May 12, 2005.

Gregory L. Christison et al., U.S. Appl. No. 11/963,499, filed Dec. 21, 2007 for "Wireless USB HUB".

International Search Report—PCT/US07/088664, International Search Authority—US, Nov. 18, 2008.

Wiquest "Wiquest Transforms Wireless Digital Video with New WQST100/101 Chipset & Breakthrough WiDV(™) Technology," Online, Dec. 11, 2006, p. 1-5.

Supplementary Partial European Search Report—EP07865988—Search Authority—Munich—Jan. 18, 2011.

Written Opinion—PCT/US2007/088664—ISA/EPO—Nov. 18, 2008.

* cited by examiner

ENHANCED WIRELESS USB PROTOCOL

PRIORITY DATA

This application claims priority to U.S. provisional patent application Ser.No. 60/871,527, titled, "ENHANCED WIRELESS USB PROTOCOL AND HUB", filed Dec. 22, 2006, the disclosure of which is incorporated herein by reference.

RELATED PATENT APPLICATION

This application is related to the following: U.S. patent application Ser. No. 11/963,499, filed Dec. 21, 2007, titled "Wireless USB Hub"; assigned to a common assignee.

TECHNICAL FIELD

The present invention relates generally to Wireless Universal Serial Bus (WUSB) interfaces. More specifically, the present invention is related to improving the throughput of Wireless USB Wire Adapter systems.

BACKGROUND

Universal Serial Bus (USB) is a serial bus standard for attaching electronic peripheral devices to a host computing device. It was designed for personal computers, but its popularity has prompted it to also become commonplace on video game consoles, PDAs, portable DVD players, mobile phones, and other popular electronic devices. The goal of USB is to replace older serial and parallel ports on computers, since these were not standardized and called for a multitude of device drivers to be developed and maintained.

USB was designed to allow peripherals to be connected without the need to plug expansion cards into the computer's expansion bus and to improve plug-and-play capabilities by allowing devices to be hot-swapped, wherein devices are connected or disconnected without powering down or rebooting the computer. When a device is first connected, the host enumerates and recognizes it, and loads the device driver needed for that device.

USB can connect peripherals such as mouse devices, keyboards, scanners, digital cameras, printers, external storage devices, etc., and has become the standard connection method for many of these devices.

The Wireless Universal Serial Bus Specification, revision 1.0 (published May 12, 2005; available from the USB Implementers Forum, Inc.) describes and specifies extensions to wired USB which enable the use of wireless links in extended USB/WUSB systems. These wireless extensions to the USB specification are referred to as Certified Wireless Universal Serial Bus or simply Wireless USB (WUSB). The extensions build on existing wired USB specifications and WiMedia Alliance MAC and PHY ultra-wide-band (UWB) wireless technology.

The WUSB Specification includes descriptions and specifications of devices known as Wire Adapters (WA). These devices are wired-USB-to-Wireless-USB adapters which allow "legacy" wired USB hosts and devices to be interconnected with WUSB devices in extended USB systems containing both wired and wireless links.

There are two types of Wire Adapters: Host Wire Adapter (HWA) and Device Wire Adapter (DWA) which work in conjunction with each other. HWAs have a wired "upstream" USB port and a wireless "downstream" WUSB port, allowing a wired USB host to communicate with WUSB devices. DWAs have a wireless "upstream" WUSB port and one or more wired "downstream" USB ports, allowing wired USB devices to communicate with a Wireless USB host.

The WUSB Specification Wire Adapter Protocol is used to transfer data through WAs and to control and manage WAs. Unfortunately, the Wire Adapter Protocol as specified in the WUSB Specification in typical situations is very inefficient, resulting in unacceptably low throughput. The inefficiency of the protocol is primarily attributable to two factors: the protocol is "chatty" in that a number of non-data messages conveying control and transfer complete status information are exchanged for each block of data transferred. In addition, the protocol does not lend itself well to "pipelining" of data flow through the system, resulting in high latency during transfer of data and therefore low throughput.

Therefore, it would be desirable to have a method for improving throughput for devices in USB systems containing both wired and wireless USB devices.

BRIEF DESCRIPTION OF THE DRAWINGS

Aspects of the present disclosure are best understood from the following detailed description when read with the accompanying figures, in which.

DETAILED DESCRIPTION

An embodiment of the present invention provides an enhanced Wire Adapter Protocol for improving data throughput for a wireless USB system that includes wire adapters that wirelessly transmit data between a host system and a wired USB device. Using this protocol, wire adapters automatically segment incoming data transfers into smaller segments, wherein a wire adapter uses its buffer status to determine how much data to fetch. Data is transferred downstream without waiting to receive a complete data segment when a wire adapter receives a specified minimum amount of data from upstream. The enhanced protocol also dispenses with Transfer Complete messages and instead determines when a data transfer has completed by polling downstream for a transfer result. The wire adapters also employ forward pipe descriptors in conjunction with remote pipe descriptors to forward transfer requests downstream.

Another embodiment of the present invention provides a Wireless USB (WUSB) hub that allows wireless communication between wired USB devices and a host system. The WUSB hub acts as a proxy for the wired USB devices and presents them to the host system as if they were native WUSB devices. The WUSB hub presents an attached wired USB device as a unique WUSB device with its own device address or as a separate function on an already existing device (the WUSB hub for instance, which may enumerate as a Device Wire Adapter).

Embodiments of the present invention include improving the throughput of WUSB Wire Adapter systems. One embodiment includes streamlining the Wire Adapter Protocol to improve the throughout of WUSB Wire Adapter systems. Another embodiment, includes presenting wired USB devices plugged into a WUSB hub as if they are "native" WUSB devices. This embodiment is referred to as a USB Device Proxy WUSB Hub, or simply WUSB hub.

Figure 1:
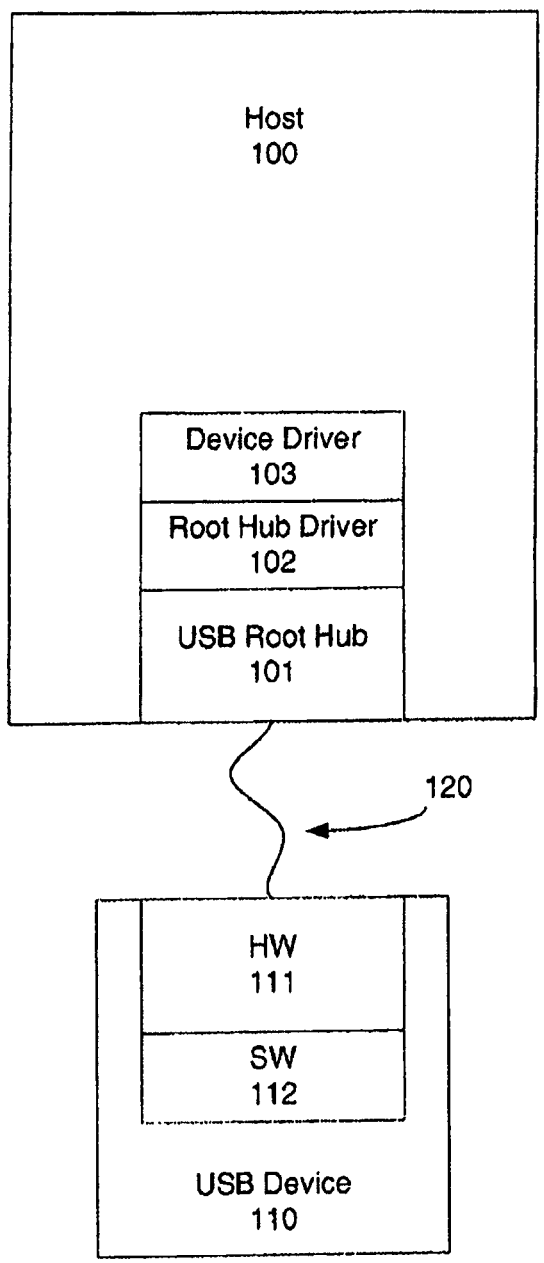
FIG. 1 shows the standard configuration of a wired USB system in accordance with the prior art.

FIG. 1 shows the standard configuration of a wired USB system in accordance with the prior art. In this configuration, the host system 100 includes the USB root hub hardware 101, USB root hub driver 102, and a device driver 103. The external USB device 110 includes adapter hardware of its own 111 and software 112 related to its functions. The host 100 and external device 110 are connected by a wired USB connection 120 which plugs into the respective USB adapters 101, 111.

Figure 2:
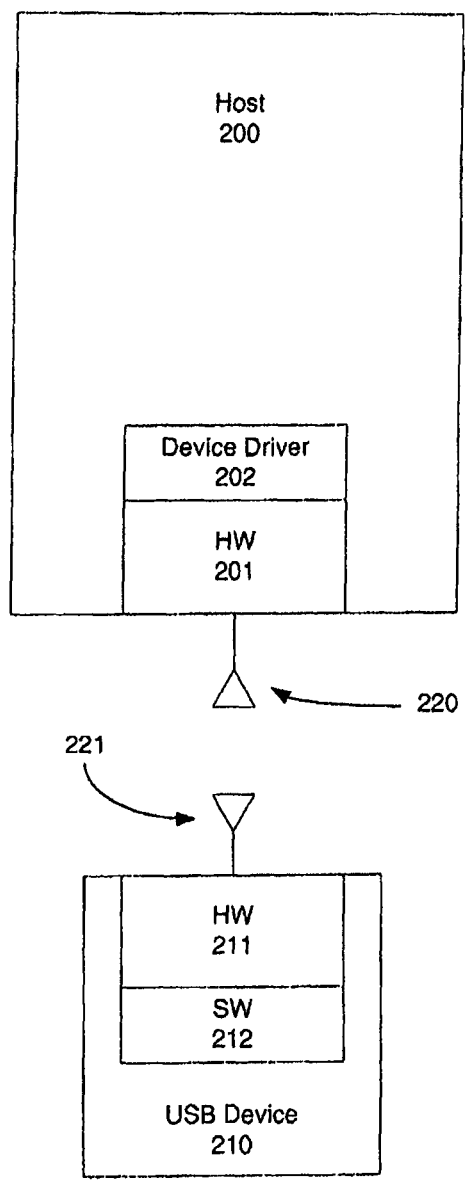
FIG. 2 shows a configuration for a Wireless USB system with a "native" WUSB device directly attached to a WUSB host.

FIG. 2 shows a configuration for a Wireless USB system with a "native" WUSB device directly attached to WUSB host. The system depicted in FIG. 2 is similar in layout to that depicted in FIG. 1, with the major difference being that both the host 200 and the external USB device 210 have built-in wireless adapters 201, 211, respectively. These adapters 201, 211 communicate over a wireless signal provided by antennae 220, 221 instead of via a wired cable. The native Wireless USB system in FIG. 2 represents the goal which much of the computer/electronics industry is attempting to reach. Currently, however, very few devices have native wireless capability. Therefore, it is desirable for the industry to accommodate systems containing both wired and wireless USB devices and hosts.

Figure 3:
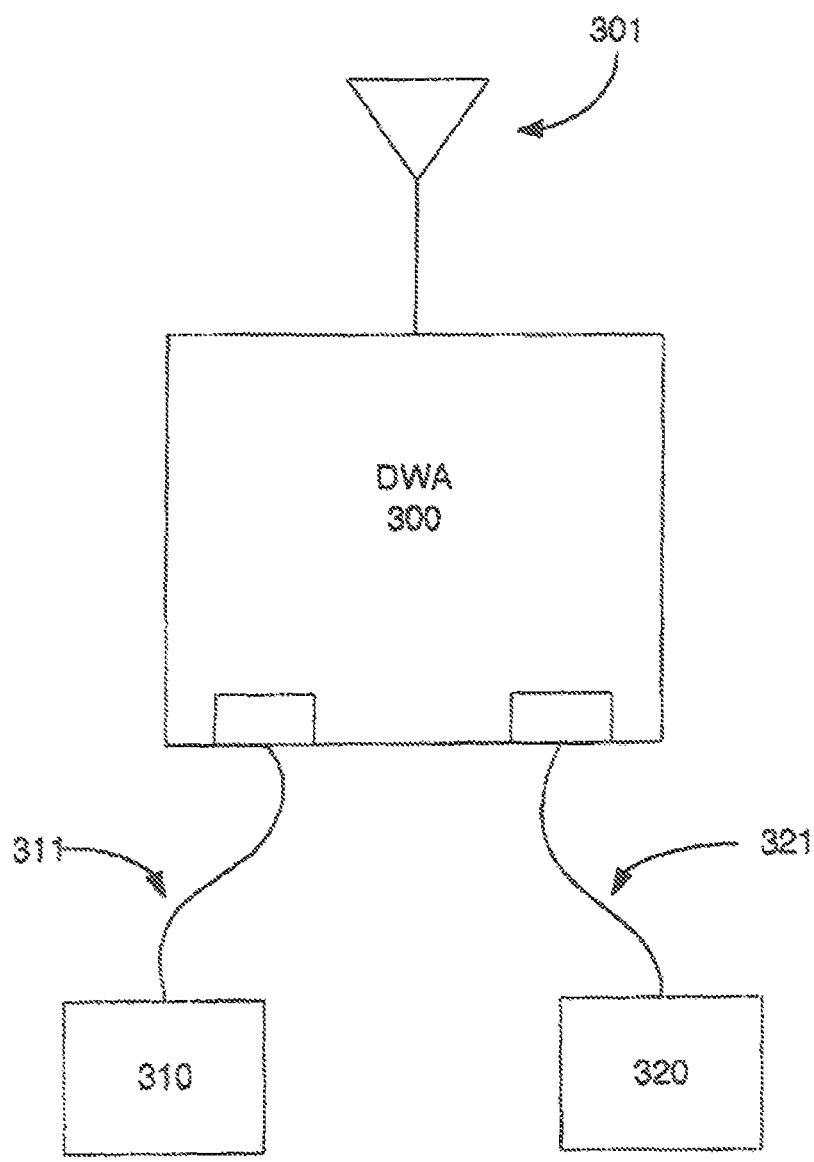
FIG. 3 shows a Device Wire Adapter connected to two wired USB devices.

The current solution for connecting wired USB devices into WUSB systems is to plug them into a Device Wire Adapter (DWA), depicted in FIG. 3. Wired USB devices 310, 320 are plugged into the DWA 300 using standard USB cables 311, 321. The DWA 300 in turn provided a wireless antenna 301 that provides a wireless link to a USB host.

A corresponding Host Wire Adapter (HWA) may be used by the host system to communicate with the DWA, or the DWA may communicate with the host system through a "native" WUSB host adapter.

Figure 4:
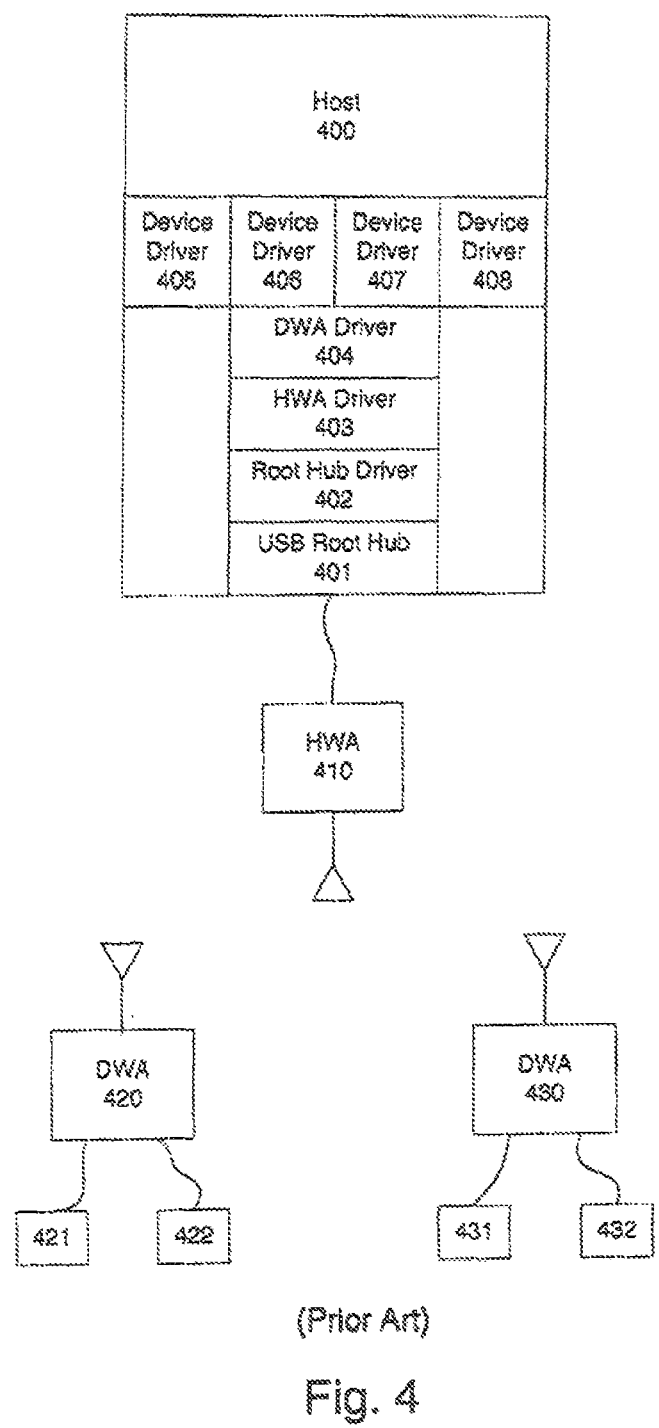
FIG. 4 shows a system incorporating Device Wire Adapters and a Host Wire Adapter to provide wireless USB functionality to legacy wired USB devices in accordance with the prior art.

FIG. 4 shows a system incorporating Device Wire Adapters and a Host Wire Adapter to provide wireless USB functionality to legacy wired USB devices. This example shows the Host Wire Adapter (HWA) 410 connected to the host 400 as an external device, which is typical of current designs. Eventually, the HWA 410 will be replaced by a native WUSB host adapter embedded inside the host 400 system.

Because the HWA 410 and DWAs 410, 420 are recognized as USB devices, the host system 400 incorporates multiple software driver layers to enable communication with wired external USB devices 421, 422, 431, 432 via the HWA 410 and DWAs 420, 430.

The host 400 has a wired USB root hub 401 to which the HWA 410 is connected (whether external or internal to the host housing). Next is the root hub driver 402. The host has a separate HWA driver 403 as well as a DWA driver 404. On top of these are device drivers 405-408 that are specific to the external USB devices 421, 422, 431, 432 at the end of the chain. Each of the device drivers 405-408 attaches to and communicates with the DWA driver 404.

Data is communicated from the host 400 to the HWA 410 through a wired connection. The HWA 410 then uses a wireless protocol to transmit the data to one of the DWAs 420, 430, which in turn sends the data to the specified USB device 421, 422, 431, or 432 over a wired connection.

Figure 5:
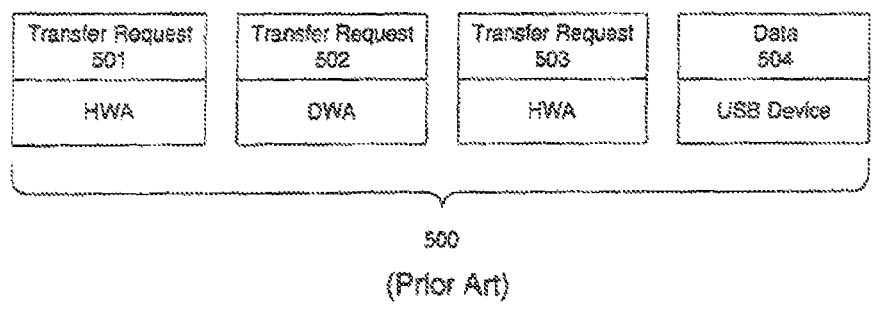
FIG. 5 shows the sequence of data packets used to communicate over the wireless USB system depicted in FIG. 4.

FIG. 5 shows the sequence of packets used to communicate over the wireless USB system depicted in FIG. 4. Due to the presence of the HWA and DWA in the system, the packet sequence 500 includes control packets inserted ahead of the data to tell the DWA which port to route the data through and get an acknowledgement. This occurs for each HWA and DWA in the system between the external device and the host.

In the example shown in FIG. 5, the data packet 504 is preceded by Transfer Request 503, while Transfer Request 502 is preceded by Transfer Request 501. Transfer Requests 501 and 503 direct the HWA to send Transfer Request 502 and data packet 504 to the DWA. Transfer Request 502 directs the DWA to send data packet 504 to the USB device. A transfer request only appears as such to its intended device. For example, the DWA transfer request 502 looks like data to the HWA but looks like a transfer request to the DWA.

As explained above, the current wireless USB systems use control packets (Transfer Requests) which are generated by multiple layers of drivers between the external device and its specific driver in the host in order to direct the flow of data to or from the target USB device. Unfortunately, this design dramatically hampers throughput.

Figure 6A:
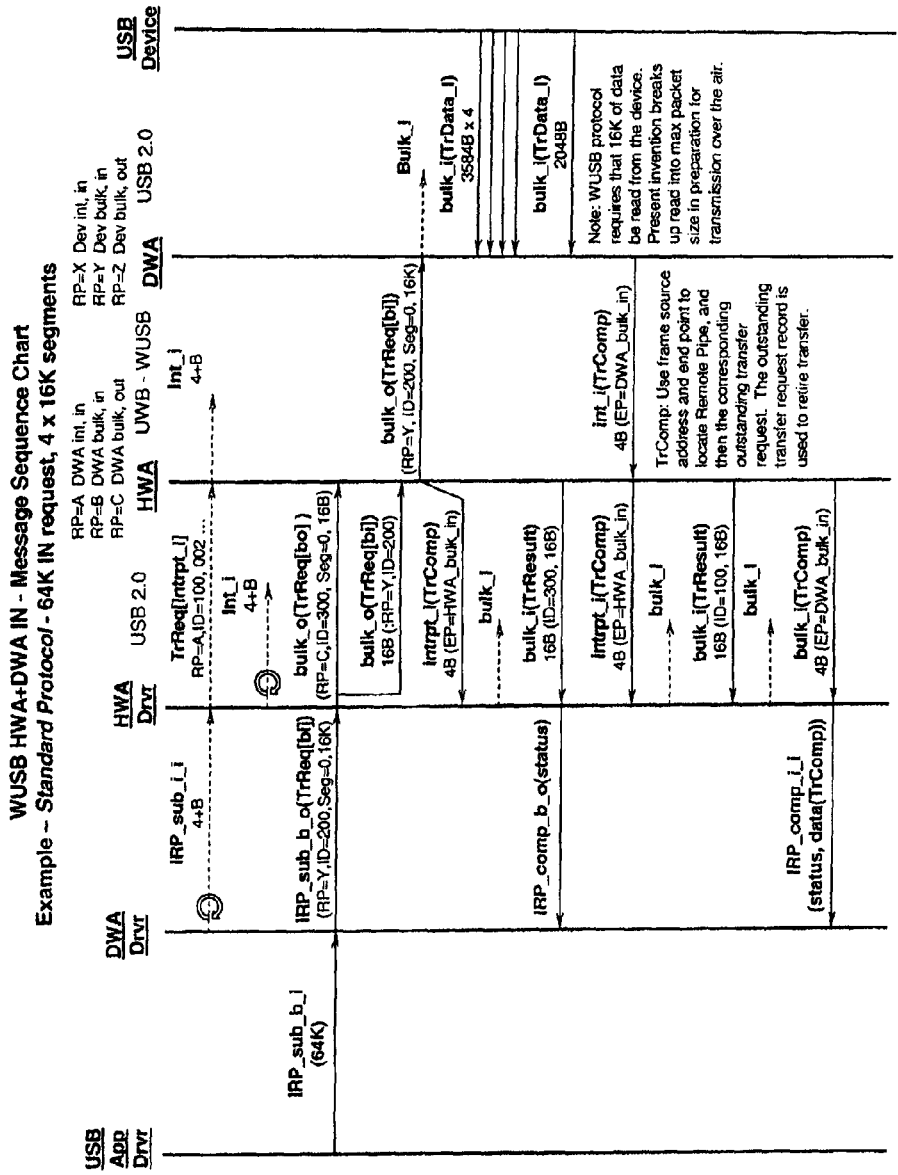
FIGS. 6A and 6B are sequence diagrams illustrating the process flow for an IN request using the standard wire adapter protocol in accordance with the prior art.
Figure 6B:
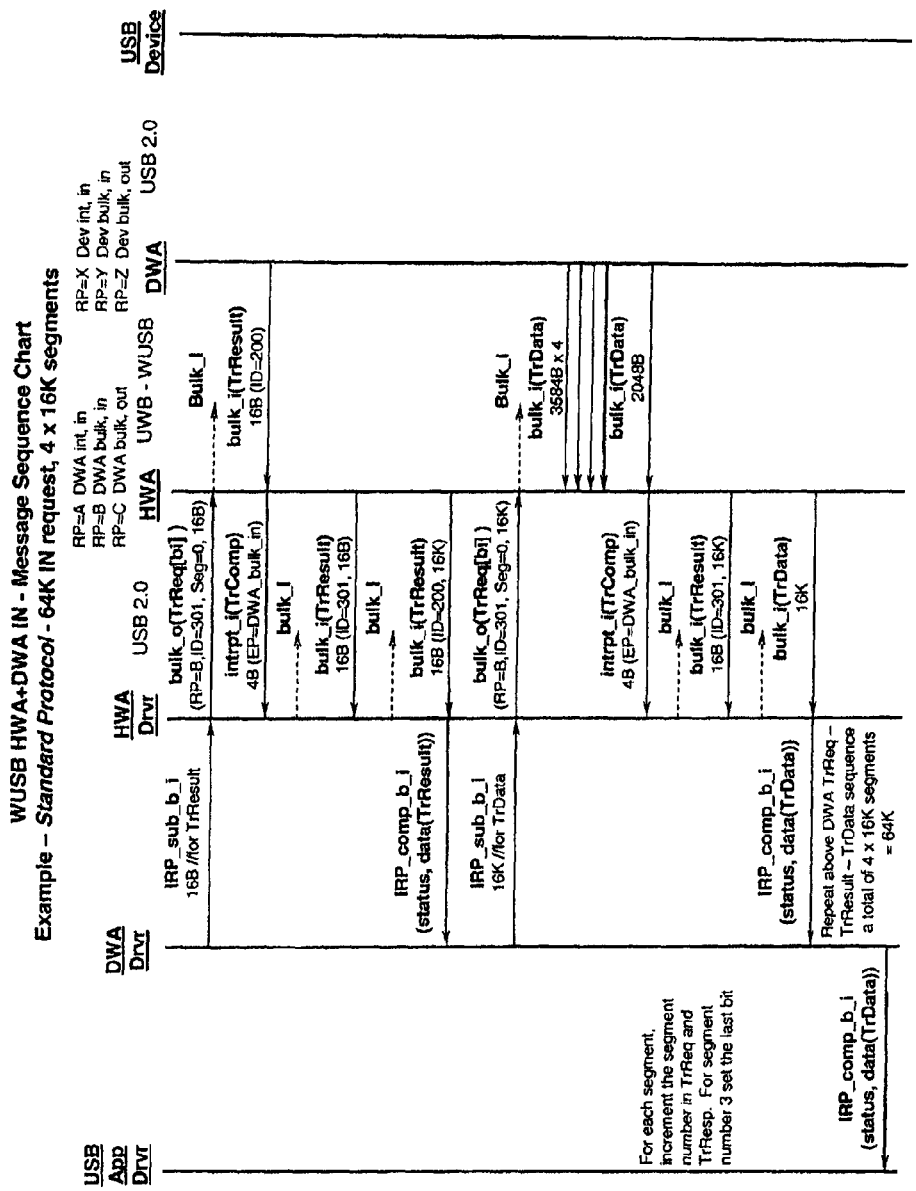
Figure 7A:
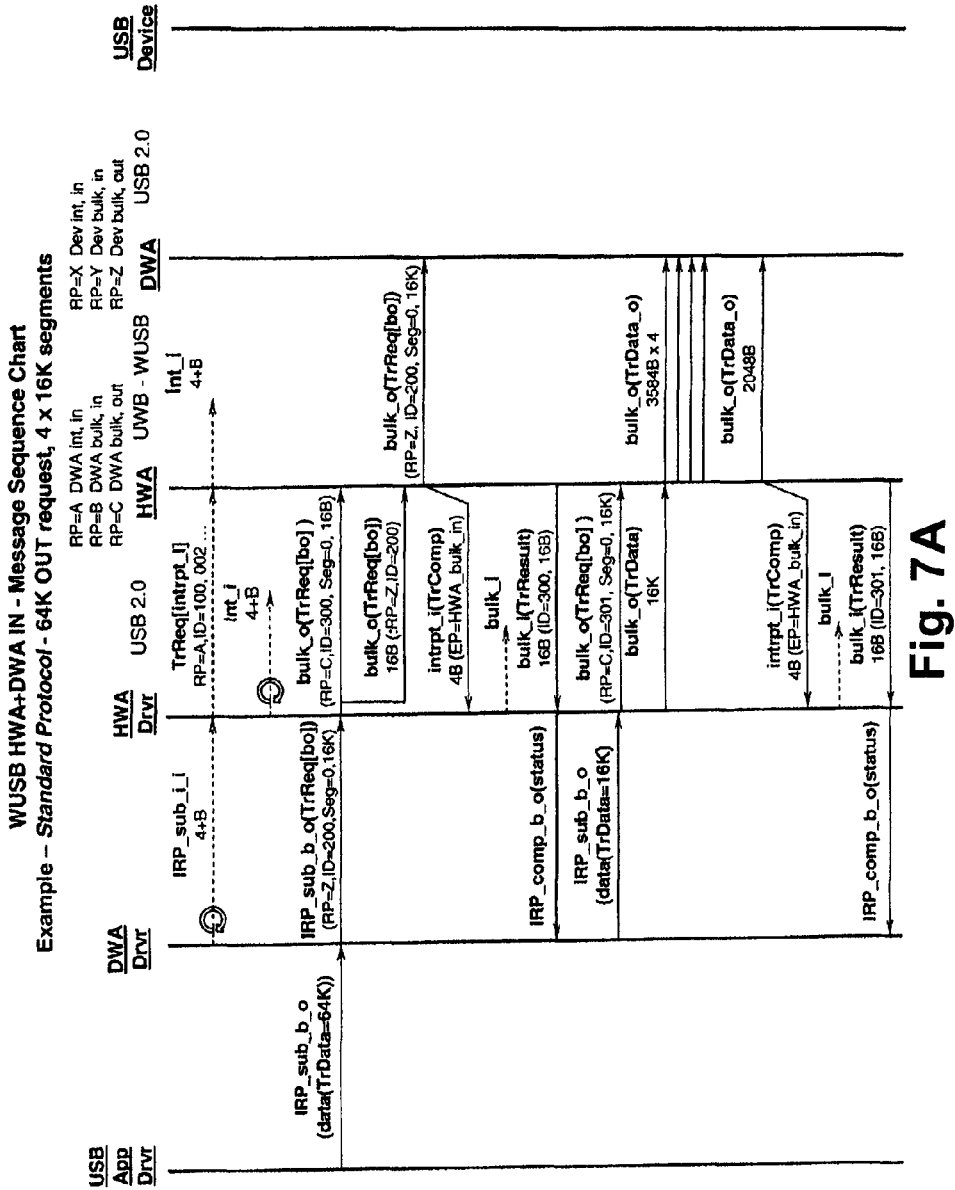
FIGS. 7A and 7B are sequence diagrams illustrating the process flow for an OUT request using the standard wire adapter protocol in accordance with the prior art.
Figure 7B:
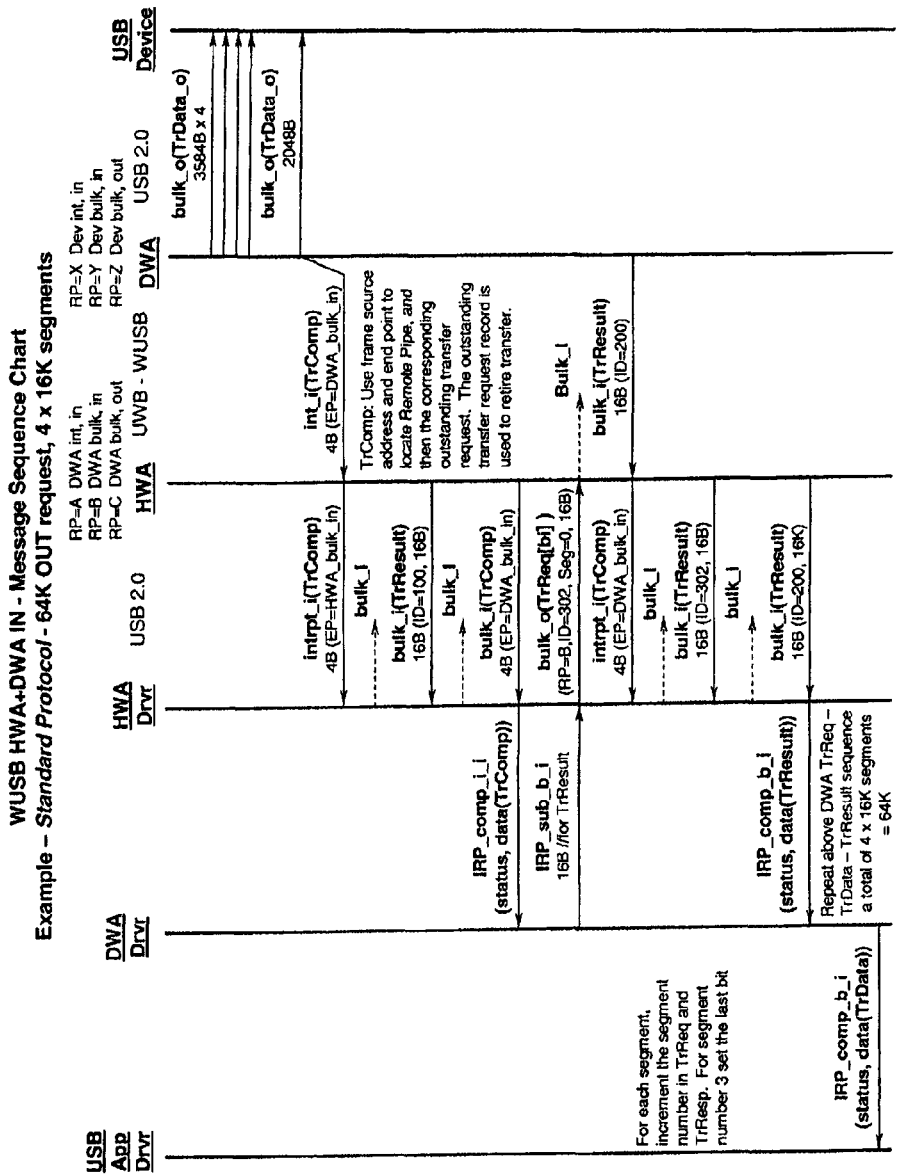

FIGS. 6A and 6B are sequence diagrams illustrating the process flow for an IN request using the standard wire adapter protocol. FIGS. 7A and 7B are sequence diagrams illustrating the process flow for an OUT request using the standard wire adapter protocol. These sequence diagrams graphically illustrate the large number of Transfer Requests necessary under the standard protocol in order to transfer data between the external USB device and its driver. Much of this complexity comes from the fact the transfer requests intended for one layer of the system are seen as data by other layers, thereby invoking acknowledgements for data receipt at each layer of the system before finally delivering the data itself to the destination.

An embodiment of the present invention includes an Enhanced Wire Adapter Protocol that improves throughput by reducing the number of messages that are exchanged as a part of data transfer, thereby reducing processing time and transfer time of the messages over the wired USB interfaces and wireless medium. Throughput is also increased by improving "pipelining" of data flow through the system, which reduces transfer latency.

The enhanced Wire Adapter Protocol eliminates the Transmit Complete message and instead uses polling for Transfer Result to determine when a transfer has completed. IN data transfers may be automatically segmented ("auto-segmentation") into smaller transfers by Wire Adapters. This pushes the intelligence functions onto the Wire Adapters and away from the host software (i.e. the DWA manages the buffer). During the auto-segmentation the size of each segment may vary, whereby the Wire Adapter dynamically and adaptively adjusts the segment size in order to maximize throughput for a given situation. The Wire Adapter automatically manages its available buffers by issuing IN tokens for pending transfers based on buffers being available to accept the IN data.

In an embodiment, a Wire Adapter driver segments a transfer request and submits all of these at once. The DWA automatically manages memory to complete each segment. For IN data, the Wire Adapter checks for memory before starting the IN transfers and for OUT data, negative acknowledgements are used to backpressure a segment for which the Wire Adapter does not have enough memory.

In another embodiment, multiple transfers between a USB host and an HWA over the upstream USB interface may be aggregated into a single USB transfer in order to reduce transfer latency. In particular, a USB host may aggregate multiple OUT transfers targeted for an HWA, and an HWA may aggregate multiple IN transfers targeted for a USB host. The receiver of aggregated transfers (HWAs in the case of OUT transfers and USB hosts in the case of IN transfers) de-aggregates aggregated transfers before further processing of the data. Receivers determine data boundaries in aggregated frames by parsing the content of aggregated transfers.

For example, a USB host may aggregate an OUT Transfer Request with the following OUT transfer data. The HWA receiving the aggregated transfer expects the next transfer to be a Transfer Request. It examines the first byte of the aggregated transfer in order to determine the length of the Transfer Request contained in the aggregated transfer. The wRPipe field in the Transfer Request is used to locate the associated wRPipe Descriptor, which is then used to determine that the Transfer Request is an OUT Transfer Request. Because the Transfer Request is an OUT request, the HWA treats the data in the aggregation transfer following the Transfer Request as OUT Transfer Data.

Hosts and HWAs may aggregate transfers up to a maximum length of wMaxPacketSize as expressed in the Standard Endpoint Descriptor for the endpoint over which the transfer occurs. Hosts and HWAs using aggregation must be prepared for every transfer to receive up to wMaxPacketSize bytes. For IN transfers hosts must issue an input request for wMaxPacketSize bytes. HWAs may de-aggregate "on-the-fly" as complete Control Transfers and data transfers are received. "On-the-fly" de-aggregation can help with buffer management and dataflow and may reduce end-to-end latency. The decision of when to aggregate and how many transfers to aggregate is implementation dependant. Typically "opportunistic" algorithms are used to make aggregation decisions. A host or HWA aggregates available transfers up to wMaxPacketSize.

For OUT transfer data packets the enhanced Wire Adapter Protocol uses packets that "cut-through" rather than being passed using "store and forward" transfer. Using this new approach, whenever some minimum amount of OUT data is received from the upstream port, the Wire Adapter may transfer the data on the downstream port, rather than wait until a complete segment of data is received. Conversely, the Wire Adapter automatically manages its available data buffers by putting "backpressure" on the upstream port by issuing negative acknowledgments (NAKs) when data buffers are not available to hold incoming data.

The enhanced Wire Adapter Protocol allows forwarding of Transfer Requests by a Wire Adapter, thereby reducing the number of messages used to complete data transfer. Referring back to the example in FIG. 5, under the enhanced protocol the DWA Transfer Request 502 looks like a Transfer Request to the HWA and not data. Thus the HWA realizes that the incoming Transfer Request is really for the DWA and forwards it to the DWA. Forwarding Pipe (FPipe) descriptors are used in conjunction with Remote Pipe (RPipe) descriptors to control forwarding of Transfer Request packets.

Figure 11:
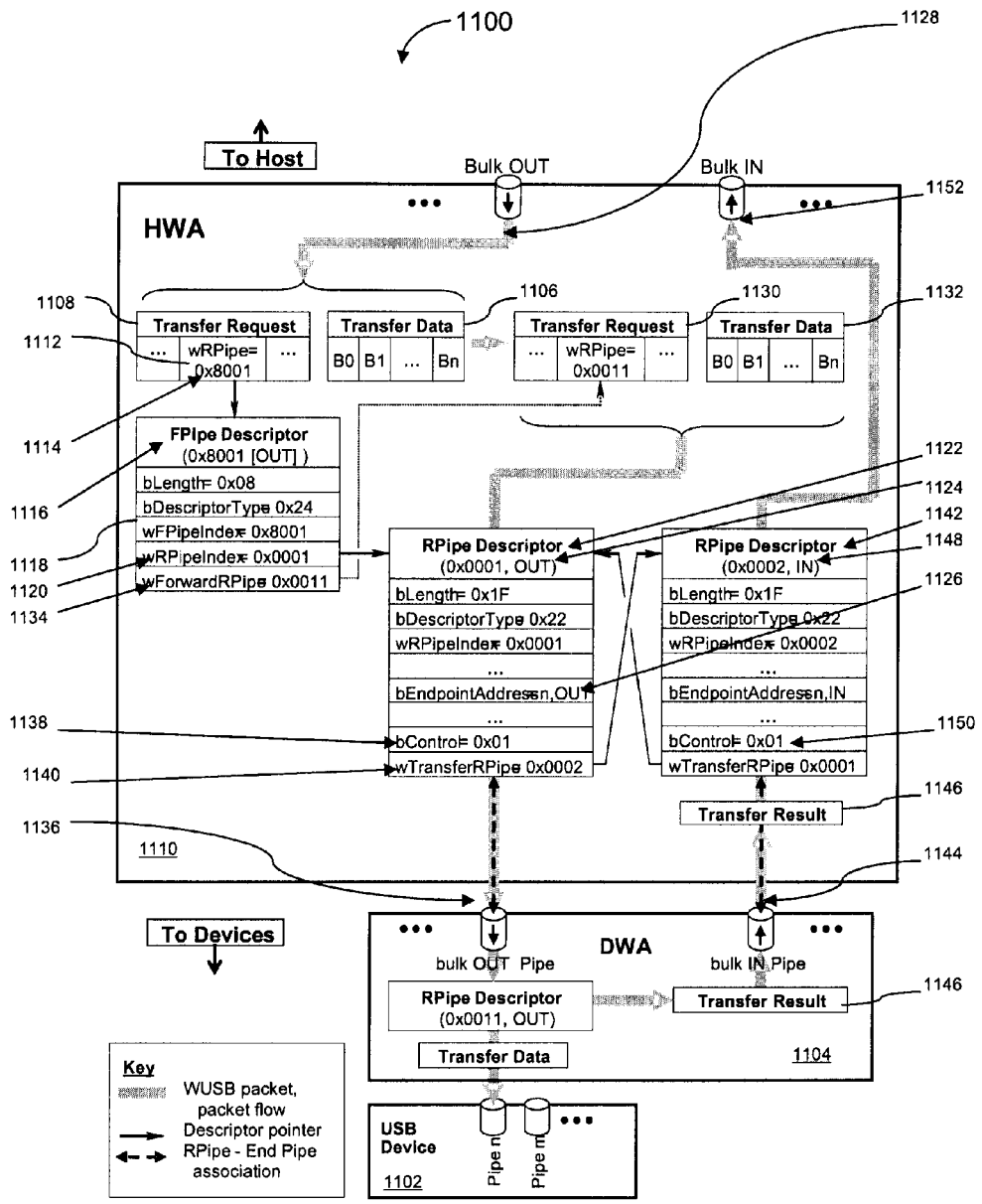
FIG. 11 shows a diagram illustrating packet flow and processing for an OUT Transfer Request forwarding that embodies aspects of the present invention.

Referring to FIG. 11, diagram 1100 illustrates packet flow and processing for an OUT Transfer Request forwarding that embodies aspects of the present invention. Diagram 1100 focuses on DWA behavior for completing a transfer when Transfer Request forwarding is implemented and the Transfer Complete message has been eliminated as discussed above. A USB application on the host presents to the DWA driver a request to transfer data that is targeted for a USB device 1102 attached to the DWA 1104. The data 1106 to be transferred is provided with the transfer request 1108. The DWA and HWA host drivers generate a Transfer Request OUT packet and en-queue the Transfer Request and Transfer Data for transfer to the HWA 1110 over the wired USB bus. The Transfer Request 1108 contains in the wRPipe field 1112 an FPipe Descriptor number 1114 (0x8001) which references the FPipe Descriptor 1116 in the HWA 1110 to be used to forward the Transfer Request 1108.

The HWA 1110 receives the Transfer Request OUT packet 1108, followed by the Transfer Data 1106, from the upstream wired USB bus. The HWA parses the Transfer Request 1108 and locates the wRPipe field 1112 in the Transfer Request 1108. In this particular example, the wRPipe field 1112 contains 0x8001.

The HWA 1110 determines that the wRPipe number 1114 refers to an FPipe descriptor 1116 because the most significant bit of the wRPipe number 1114 is a one. This indicates to the HWA 1110 that the corresponding pipe descriptor is found in the FPipe Descriptor table 1118 (rather than the RPipe Descriptor table), and that the Transfer Request 1108 should be forwarded. In this particular example, since the wRPipe number 1114 is 0x8001, the index of the FPipe Descriptor 1116 in the FPipe Descriptor Table 1118 is 0x0001. The HWA 1110 locates FPipe Descriptor 1116 0x0001 in the FPipe descriptor table 1118.

The wRPipeIndex field 1120 in FPipe Descriptor 0x0001 (1116) is used to locate the Transfer Request RPipe Descriptor 1122. In this particular example the RPipe Descriptor index 1124 is 0x0001. The HWA 1110 determines the transfer request target device address, device endpoint and direction using the bDeviceAddress and bEndpintAddress 1126 in the RPipe Descriptor 1122. In this example, the Transfer Request 1108 is an OUT, which indicates to that the HWA 1110 to expect Transfer Data 1106 following the Transfer Request 1108 on the upstream USB bulk OUT endpoint 1128, and the HWA should use OUT RPipe Descriptor 0x0001 (1122) for delivering both the forwarding Transfer Request 1130 and the Transfer Data 1132.

The HWA 1110 uses the received Transfer Request 1108 to generate a forwarding Transfer Request 1130 by replacing the wRPipe field 1112 in the received Transfer Request 1108 with the wForwardRPipe value 1134 in the FPipe Descriptor 1116.

The HWA 1110 en-queues on the downstream wireless interface 1136 for transfer to the DWA 1104 the forwarding Transfer Request 1130 and the Transfer Data 1132 (once the data has been received on the upstream USB Bulk OUT endpoint 1128). The HWA adds the two byte WUSB header to the beginning of the Transfer Request packet and to the beginning of each data packet in the transfer before en-queuing them on the downstream wireless interface 1136.

Once the forwarding Transfer Request 1130 and Transfer Data 1132 have been transferred to the DWA 1104, the HWA 1110 examines the bControl field 1138 in the OUT RPipe descriptor 1122 (0x0001, which was used to deliver the Transfer Request 1108 and Data 1106) and determines that the Automatic Request and Forwarding of Transfer Results and Transfer Data option is enabled (bit zero in the bControl field). The HWA 1110 then uses the wTransferRPipe field 1140 in the OUT RPipe Descriptor 1122 in order to locate the RPipe Descriptor 1142 associated with the bulk IN pipe 1144 of the downstream DWA 1104. Associated with the IN RPipe Descriptor 1142 is a Pending Transfer list (not shown in the diagram 1100). The HWA 1110 adds an entry in the Pending Transfer list that indicates that a Transfer Result for an OUT transfer is expected from the downstream DWA bulk IN pipe 1144.

Because of the entry in the IN RPipe Pending list indicating that a Transfer Result 1146 is expected, the HWA 1110 begins issuing IN tokens to the bulk IN endpoint 1144 on the downstream DWA 1104 in order to receive the expected Transfer Result 1146.

When the Transfer Result 1146 is received from the DWA 1104, the HWA 1110 uses the SrcAddr field in the packet MAC header and the Endpoint Number field in the WUSB header in order to locate the RPipe descriptor associated with the device and endpoint from which the Transfer Result was received. In this particular example, the device is the DWA 1104, the endpoint is the DWA bulk IN endpoint, and the corresponding RPipe in the HWA for the DWA endpoint is RPipe Descriptor 0x0002 (1148).

The HWA 1110 locates in the RPipe Pending Transfer list the entry corresponding with the received Transfer Result 1146, based on matching Transfer IDs in the Transfer Result 1146 and Pending Transfer list. The HWA 1110 determines that from the Pending Transfer list entry that the Transfer Result 1146 is for an OUT transfer and therefore no data follows the Transfer Result 1146.

The HWA 1110 examines the bControl field 1150 in IN RPipe descriptor 0x0002 (1142) and determines that the Automatic Request and Forwarding of Transfer Results and Transfer Data option is enabled (bit zero in the bControl field). Based on this option being enabled, the HWA 1110 automatically en-queues the Transfer Result packet 1146 on the upstream USB interface bulk IN endpoint 1152 for transfer to the host. The HWA 1110 then deletes the entry in the RPipe Descriptor 0x0002 (1142) Pending Transfer list corresponding to the expected Transfer Result 1146.

The HWA host driver maintains pending transfer records similar to the Pending Transfer list in the HWA 1110. Based on the pending transfer records the HWA driver expects a Transfer Result 1146 for the previously transmitted Transfer Request 1108, and therefore the HWA driver requests an IN transfer which causes IN tokens to be sent to the HWA wired USB interface bulk IN endpoint 1152. The HWA sends the Transfer Result to the host as soon as the Transfer Result 1146 comes to the top of the bulk IN queue and an IN token is received. When the Transfer Result 1146 is passed to the HWA driver the HWA 1110 updates its records based on the information in the Transfer Result 1146, and the WUSB transfer is complete.

Figure 12:
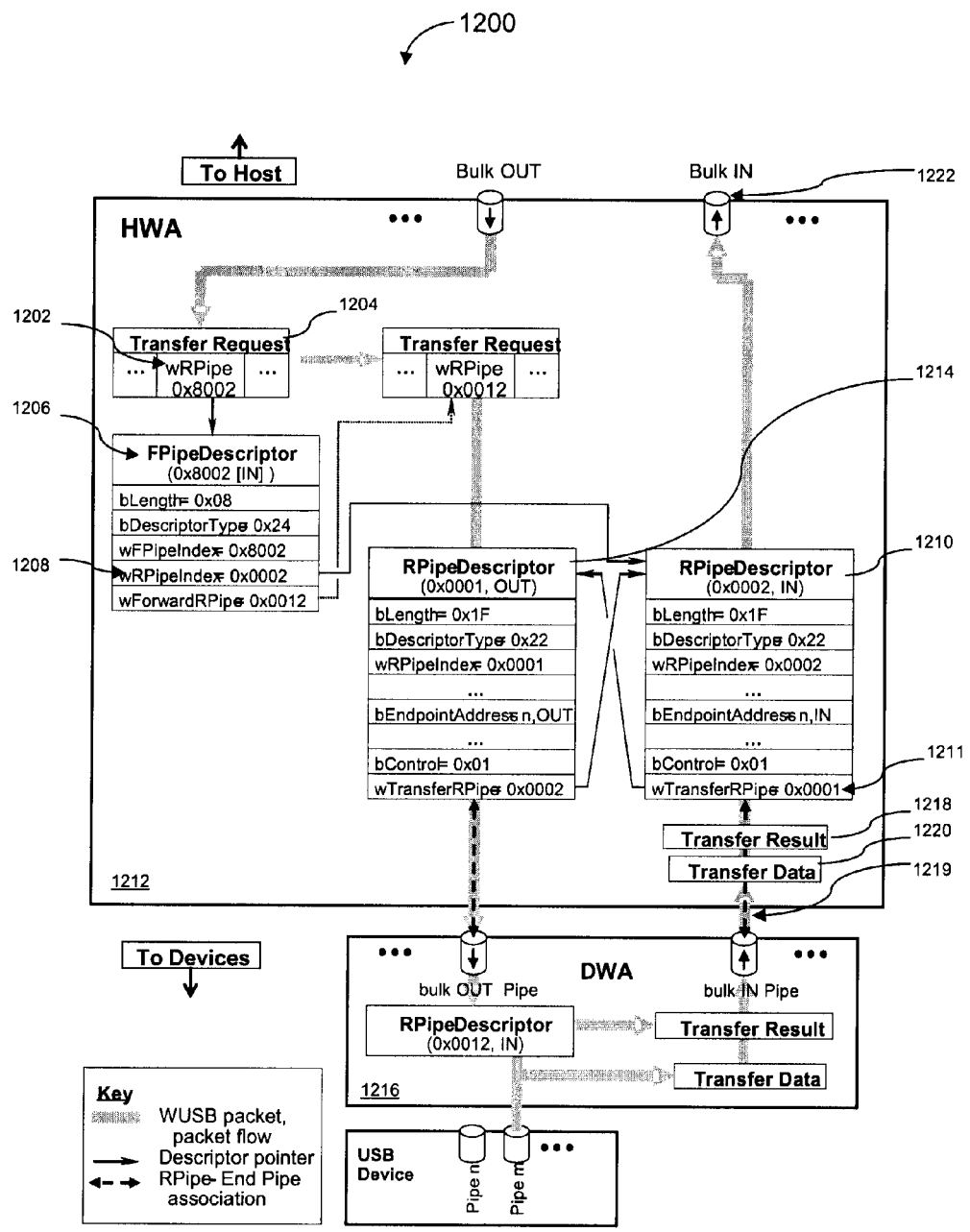
FIG. 12 shows a diagram illustrating packet flow and processing for an IN Transfer Request forwarding that embodies of the present invention.

Referring to FIG. 12, diagram 1200 illustrates packet flow and processing for an IN Transfer Request forwarding that embodies aspects of the present invention. The packet flow and processing for the IN Transfer Request forwarding is similar to the packet flow and processing for the OUT Transfer Request forwarding. The differences are as follows:

The wRPipe field 1202 (0x8002) in the IN forwarding Transfer Request 1204 references an FPipe Descriptor 1206 (0x0002) containing a wRPipeIndex field 1208 (0x0002) that references an IN RPipe 1210. Because the RPipe in this case is for an IN, the HWA 1212 does not expect Transfer Data to follow the Transfer Request 1204, and therefore forwards the Transfer Request 1204 with no following data.

The HWA 1212 uses wTransferRPipe field 1211 in the IN RPipe 1210 (0x0002) to locate the OUT RPipe 1214 that is used to deliver the Transfer Request 1204. After the Transfer Request 1204 is transferred to the DWA 1216, the HWA 1212 adds an entry in the Pending Transfer list that indicates that a Transfer Result 1218 for an IN transfer is expected from the downstream DWA bulk IN pipe 1219.

When the HWA 1212 receives the Transfer Result 1218, it then attempts to read from the downstream DWA bulk IN endpoint 1219 the number of bytes indicated in the dwTransferLength field of the received Transfer Result 1218. The HWA 1212 expects the data because the corresponding entry in the Pending Transfer list indicates an IN transfer.

After the HWA 1212 receives the expected data, it en-queues the Transfer Result 1218 and Transfer Data 1220 on the upstream wired USB bulk IN endpoint 1222, for transfer to the host. If automatic segmentation is enabled, the HWA 1212 may segment the data and en-queue a Transfer Result with each data segment. The bTransferSegment field in each Transfer Result is set to the segment number.

For Transfer Request forwarding the Wire Adapter host driver maintains an association between Transfer IDs in a Transfer Request accepted from another Wire Adapter host driver and the resulting transfer generated by the Wire Adapter. It then uses this association to modify the Transfer ID in Transfer Request and Transfer Result packets.

Transfer IDs are 32 bit values used by Wire Adapter drivers and Wire Adapters to uniquely identify transfers and to associate packets with specific transfers. For each transfer initiated by a HWA or DWA host driver, a unique Transfer ID is generated and placed in the corresponding Transfer Request. When generating Transfer Result packets, HWAs and DWAs place in the Transfer Result the Transfer ID from the Transfer Request for the transfer.

With the standard Wire Adapter Protocol, Transfer IDs are unique in the context of a DWA or HWA driver instance and corresponding Wire Adapter. Take for example the case of a DWA attached to an HWA which in turn is attached to a host. When the DWA driver generates a Transfer Request it selects a unique Transfer ID to place in the Transfer Request. The HWA driver and HWA deliver the DWA drive Transfer Request to the DWA without examining the content of the Transfer Request (as far as the HWA sub-system is concerned, the Transfer Request is data to be transferred). When the Transfer Request is delivered to the DWA the DWA parses the Transfer Request in order to determine what to do, and uses the Transfer ID in the resulting Transfer Response.

However, in order for the HWA driver to deliver the DWA Transfer Request, the HWA driver generates its own Transfer Request for the HWA. The Transfer ID placed in the HWA Transfer Request that is used to deliver the DWA Transfer Request is unrelated to the Delivery ID in the DWA Transfer Request. Stated differently, each Wire Adapter driver "layer" maintains its own set of unique Transfer IDs and is unaware of the Transfer IDs generated and used by other Wire Adapter drivers.

However, when Enhanced Wire Adapter Protocol Transfer Request Forwarding is being used handling of Transfer IDs is necessarily different than with the standard protocol. When a Transfer Request is forwarded from one Wire Adapter to another, the Transfer Request is processed by both the forwarding and target Wire Adapters, and the Transfer ID is used by both Wire Adapters. In this case both Wire Adapters are working with the same set of Transfer IDs. The same is true of forwarded Transfer Result packets, the same Transfer ID is used by one or more Wire Adapters.

Forwarding does not require special handling of Transfer IDs by the Wire Adapters, but does require specific processing by the host drivers. If forwarding is being used by a host driver and its corresponding Wire Adapter, then when the host driver accepts a Transfer Request from another ("upstream") host driver it parses the Transfer Request to locate the Transfer ID. The host driver then generates a new Transfer ID that is unique within the scope of the driver and Wire Adapter and places the new Transfer ID in the Transfer Request before forwarding it to the next driver. The host driver also creates a record that provides the association between the Transfer ID provided by the upstream Wire Adapter and the Transfer ID generated by the host driver.

Then, when the host driver receives a Transfer Result, it looks up the Transfer Result Transfer ID it its Transfer ID association table and determines that the corresponding Transfer Request was forwarded. It then replaces the Transfer ID with the value from the Transfer ID association table (i.e. with the original Transfer ID) before passing the Transfer Result to the original requesting driver. In this way the effect of forwarding on Transfer IDs by a "downstream" driver is made transparent to a host "upstream" driver.

Alternately, implementations are possible where a single host driver manages two or more serially connected Wire Adapters (for example a DWA connected to a HWA). In this case the single host driver is fully aware of the effect of forwarding and can account for it by generating Transfer IDs that are used by both the DWA and HWA.

Under the enhanced protocol a Wire Adapter automatically polls a downstream Wire Adapter for Transfer Result packets based on a previous Transfer Request to that downstream Wire Adapter. Similarly, the Wire Adapter forwards any received Transfer Result to the upstream interface rather than generating and forwarding a Transmit Complete and new Transfer Result.

Rather than the poll for downstream data initiated by receiving a Transfer Request from the host driver, the Wire Adapter automatically polls a downstream device for IN data based on previously receiving a Transfer Result for an IN data transfer. Similarly, rather than generating and forwarding a Transmit Complete and new Transfer Result, the Wire Adapter simply forwards IN Transfer Data to the upstream interface after reception.

In still another embodiment, Multiple Wire Adapter drivers (HWA and DWA) may be combined into a single Wire Adapter driver in order to reduce the number of Application Programming Interfaces (APIs) and therefore the latency incurred by passing of messages across the APIs. In addition, combining multiple Wire Adapter drivers allows consolidation in the assignment of Transfer IDs, such that when Transfer Request forwarding is being used the need to maintain the association between Transfer IDs in Transfer Request presented from an upstream driver and the Transfer IDs in issued Transfer Request is eliminated.

Figure 8:
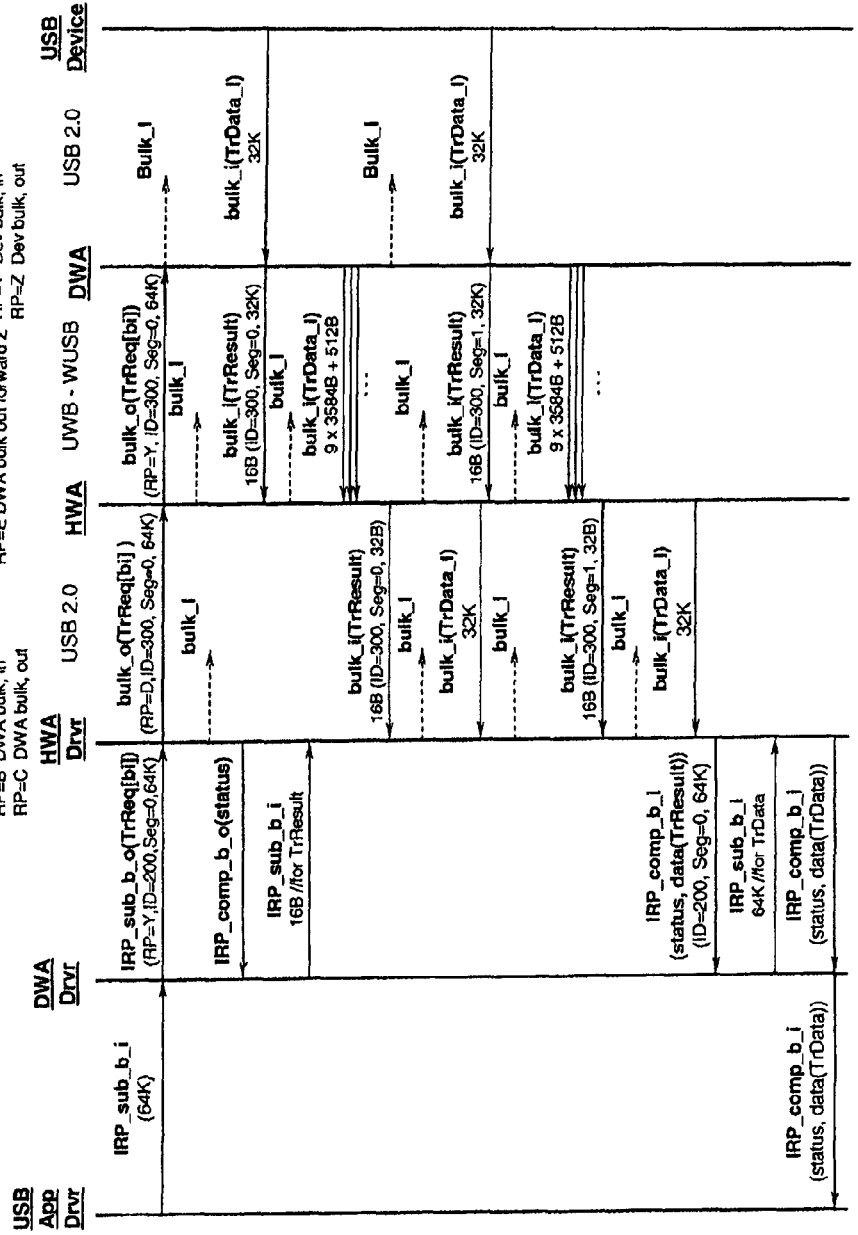
FIG. 8 is a sequence diagram illustrating the process flow for an IN request using the enhanced wire adapter protocol that embodies aspects of the present invention.
Figure 9:
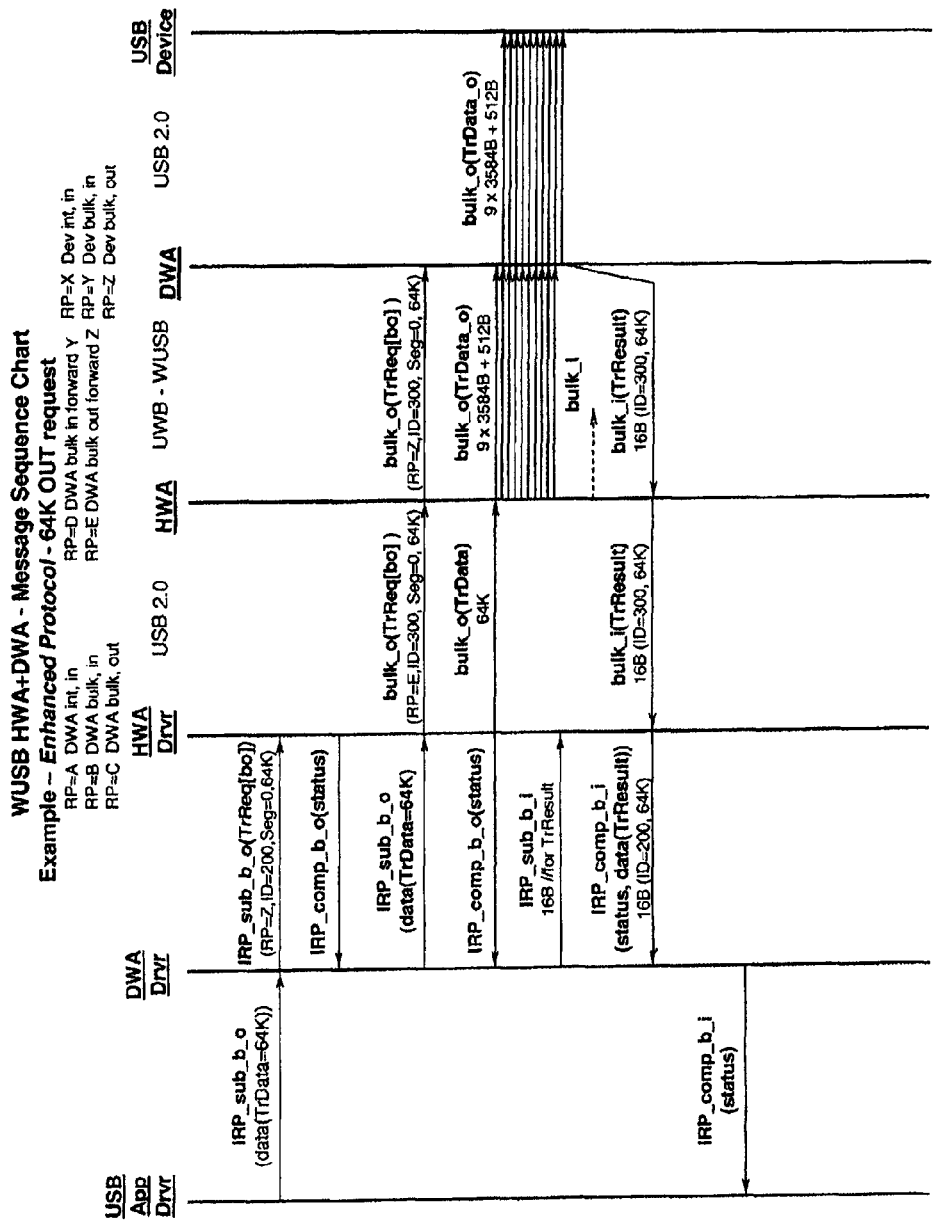
FIG. 9 is a sequence diagram illustrating the process flow for an OUT request using the enhanced wire adapter protocol that embodies aspects of the present invention.

FIG. 8 is a sequence diagram illustrating the process flow for an IN request using the enhanced wire adapter protocol that embodies aspects of the present invention. FIG. 9 is a sequence diagram illustrating the process flow for an OUT request using the enhanced wire adapter protocol that embodies aspects of the present invention. FIGS. 8 and 9 illustrate the reduction in control overhead provided by the enhanced Wire Adapter Protocol in comparison to the sequence diagrams shown in FIGS. 6A, 6B, 7A, and 7B depicting the existing protocol.

Figure 10:
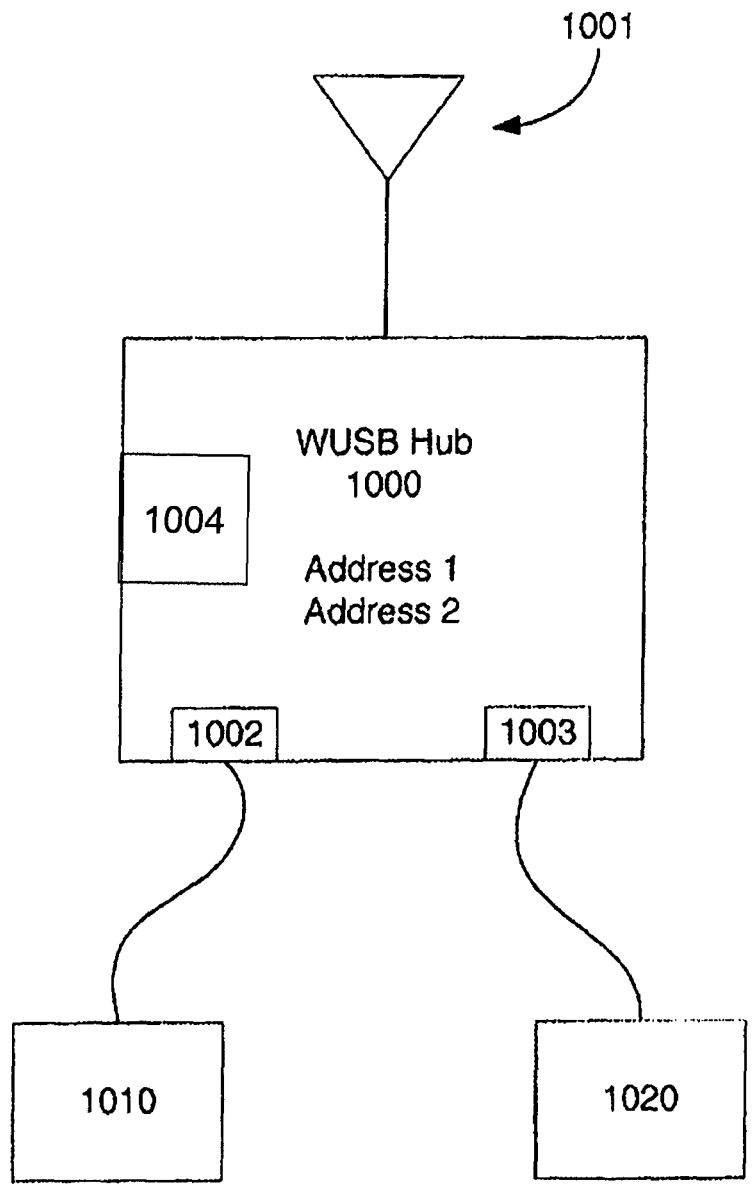
FIG. 10 shows a Wireless USB hub as that embodies aspects of the present invention.

FIG. 10 shows a Wireless USB hub that embodies aspects of the present invention. As explained above, the current Wire Adapter protocol is relatively inefficient, whereas the WUSB protocol for "native" WUSB devices is relatively efficient. The Proxy WUSB Hub 1000 takes advantage of this efficiency by presenting wired USB devices 1010, 1020 as if they are "native" WUSB devices.

The Proxy WUSB Hub 1000 is similar to a DWA in that it has a wireless upstream port 1001 and one or more wired USB downstream ports 1002, 1003, wherein wired USB devices 1010, 1020 may be plugged into the downstream wired USB ports. The WUSB Hub differs from a DWA in that the wired USB devices 1010, 1020 appear to the host system as if they are native WUSB devices. This is accomplished by having the WUSB Hub 1000 "proxy" the attached downstream wired devices on the wireless interface. Therefore, the WUSB hub 1000 appears to the host as one or more WUSB devices, not a DWA, which eliminates much of the control packet overhead used by the standard Wire Adapter Protocol.

An attached wired USB device either 1) is presented as a unique WUSB device with its own device address, or 2) is presented as a separate function on an already existing device (the WUSB hub for instance, which may enumerate as a DWA). With this latter approach the wired device endpoints are mapped into WUSB hub endpoints.

The WUSB Hub uses various mechanisms in order to properly proxy a USB device to the host as if it is a WUSB device. The following description applies to the case when the WUSB hub presents downstream USB devices as WUSB devices, rather than as functions on the DWA.

Each WUSB device maintains a security connection context. The connection context is negotiated during first-time connection. The WUSB Hub negotiates the security connection context for the USB devices without the knowledge or involvement of the downstream devices and stores the security connection context. A sufficient number of unique security connection contexts are negotiated and maintained in order to support the maximum number of downstream USB devices that the WUSB hub is capable of simultaneously proxying. A specific connection context is not tied to a particular downstream USB device, rather the connection contexts are applied as needed when USB devices are attached.

The WUSB hub maintains a unique WUSB device address for each attached proxy USB device, and it participates in the WUSB protocol as if it were the WUSB devices it is proxying, rather than appearing as an intervening device (like a DWA).

The WUSB Hub detects USB attachment either directly or by intercepting interrupt packets from attached downstream hubs. Upon detecting attachment of downstream devices the WUSB hub does not forward interrupt packets to the host or directly inform the host of USB attachment. Instead, the WUSB hub performs a WUSB device connection procedure on behalf of the USB device.

The WUSB hub reads the descriptors of the USB devices and modifies them so that they are consistent with descriptors for WUSB devices. For example, the maximum packet size field in the Standard Endpoint Descriptor is modified so that it is consistent with WUSB packet sizes. The bmAttributes field in the Standard Configuration Descriptor is set to indicate that the device is self-powered.

For some USB devices which do not use zero-packet-length semantics to indicate the end of transfers, the lengths of IN transfers are used so that the correct number of bytes are read. However, in the case of a WUSB hub, the length of IN transfers is not available with the WUSB protocol. Without transfer requests, there is no previously declared limit on the amount of data to read. Fortunately, the upstream wireless device is provided with the expected length of transfers.

The WUSB protocol is modified slightly in order to support the WUSB hub. Two options are available. In the first option, the maximum packet size field in IN Channel Time Allocation (CTE), Information Elements (IEs) sent in WUSB host Micro-scheduled Management Control (MMC) can be used to indicate the expected transfer length. Alternatively, a field may be added to CTAs to indicate the expected transfer length.

In an embodiment of the present invention, the WUSB hub includes a controller 1004 to perform the functions and operations of the WUSB hub, discussed above.

For the case in which a WUSB hub proxies one or more downstream USB devices as functions on the WUSB hub/DWA, the above description generally applies, except that the security connection context and WUSB device address is shared with the WUSB hub. In addition, when a USB device attaches, the WUSB hub maps WUSB hub wireless endpoints one-for-one for USB device endpoints and treats the collection of endpoints associated with a particular USB device as a function on the WUSB hub. The WUSB hub informs the host that a new function needs to be enumerated in order to activate support for a newly attached device.

Although embodiments of the present disclosure have been described in detail, those skilled in the art should understand that they may make various changes, substitutions and alterations herein without departing from the spirit and scope of the present disclosure.

What is claimed is:

1. A method for increasing throughput for a wireless universal serial bus (USB) system, the method comprising:
   aggregating a first packet with a second packet at a first USB enabled device wherein the first packet comprises a control packet, wherein the second packet comprises a data packet;
   changing at least one pipe descriptor in a field value in the first packet to indicate a forwarding transfer for the first and second packets;
   transferring said aggregated packets in a single transfer from said first USB enabled device over a wire connection to a second USB enabled device;
   disaggregating said aggregated packets at said second USB enabled device after said transferring; and
   sending a transfer result packet from said second USB enabled device to said first USB enabled device, the transfer result packet corresponding to the transferred aggregated packets and indicating that said transferring step has completed.

2. The method of claim 1, wherein said first USB enabled device is a USB enabled host device, wherein said second USB enabled device is a host wire adapter, and wherein aggregating said first packet with said second packet comprises aggregating OUT transfers, said OUT transfers indicating a data direction from said USB enabled host device and targeted to said host wire adapter, wherein said control packet comprises a transfer request packet, and wherein said data packet comprises a transfer data packet.

3. The method of claim l, wherein said first USB enabled device is a host wire adapter, wherein said second USB enabled device is a USB enabled host device, and wherein aggregating said first packet with said second packet comprises aggregating IN transfers, said IN transfers indicating a data direction into said USB enabled host device and targeted to said USB enabled host device, wherein said control packet comprises a transfer result packet, wherein said data packet comprises a transfer data packet.

4. A method for increasing throughput for a wireless universal serial bus (USB) system, wherein the system comprises a plurality of layers having various USB enabled devices, the method comprising:
   receiving at a wire adapter at a second layer of the system a transfer request packet from a USB enabled host device at a first layer of the system via a first interface of the wire adapter, wherein said transfer request packet indicates an amount of data to be transferred to the USB enabled host device;
   changing at least one pipe descriptor in a field value in the transfer request packet to indicate a forwarding transfer of the transfer request packet;
   determining at the wire adapter that a data buffer of said wire adapter is available to receive a segment of said amount of data;
   generating by the wire adapter a message based on said availability of said data buffer;
   providing said message to a USB enabled device via a second interface of the wire adapter indicating that said data buffer is available to receive said segment from the USB enabled device;
   receiving said segment in a single transfer;
   segmenting said segment into a plurality of transfer segments; and
   transferring, in a plurality of transfers, said plurality of transfer segments to the USB enabled host device via the first interface of the wire adapter,
   wherein segmenting said segment comprises dynamically and adaptively adjusting a size of at least one of said plurality of transfer segments based on having received a portion of the segment.

5. The method of claim 4, wherein said USB enabled device is downstream from said wire adapter, and wherein said message comprises a token that indicates said data buffer is available to receive said segment from said USB enabled device.

6. The method of claim 5, wherein said USB enabled device is a device wire adapter and wherein said wire adapter is a host wire adapter.

7. The method of claim 4, wherein said plurality of transfer segments vary in size based at least in part on said availability of said data buffer determined at said wire adapter.

8. The method of claim 4, wherein segmenting said segment comprises dynamically and adaptively adjusting the size of at least one of said plurality of transfer segments to maximize throughput for a given situation.

9. A method for increasing throughput for a wireless universal serial bus (USB) system, the method comprising:
   sending, by a wire adapter, a transfer request packet via a first interface of the wire adapter, wherein the transfer request packet is associated with a bulk transfer;
   changing at least one pipe descriptor in a field value in the transfer request packet to indicate a forwarding transfer of the transfer request packet;
   polling for a transfer result packet from a downstream USB enabled device by issuing tokens via the first interface of the wire adapter, wherein the transfer result packet is associated with the bulk transfer and indicates that said bulk transfer has completed;
   receiving said transfer result packet via said first interface of said wire adapter; and
   transferring said transfer result packet via a second interface of said wire adapter.

10. The method of claim 9, further comprising polling for an incoming data packet associated with the bulk transfer from the downstream USB enabled device in response to receiving the transfer result packet from the downstream USB enabled device.

11. The method of claim 10, further comprising:
segmenting said incoming data packet into a plurality of segments; and
forwarding at least one segment of said incoming data packet via a second interface of said wire adapter.

12. A method for increasing throughput for a wireless universal serial bus (USB) system, the method comprising:
forwarding a first transfer request packet from a forwarding wire adapter to a device wire adapter via a wireless interface, the first transfer request packet including at least one pipe descriptor field indicating a forwarding transfer of the first transfer request packet;
in response to forwarding the first transfer request packet, adding an entry to a list of entries corresponding to pending transfer request packets, the entry corresponding to the first transfer request packet; and
polling for a transfer result packet from the device wire adapter based on said entry in said list by issuing tokens via said wireless interface, said transfer result packet indicating that a data transfer has completed.

13. The method of claim 12, further comprising deleting the entry corresponding to the first transfer request packet in response to receiving the transfer result packet.

14. A communication apparatus, the apparatus comprising:
a data buffer;
a unit configured to receive a transfer request packet from a universal serial bus (USB) enabled device, wherein said transfer request packet indicates an amount of data to be transferred to said USB enabled device and includes at least one pipe descriptor in a field indicating a forwarding transfer of the transfer request packet;
a unit configured to determine that the data buffer is available to receive a segment of said amount of data;
a unit configured to generate a message based on said availability of said data buffer;
an interface configured to provide said message to a second USB enabled device indicating that said data buffer is available to receive said segment from the second USB enabled device;
wherein said second USB enabled device is downstream from said apparatus;
wherein said message comprises a token that indicates said data buffer is available to receive said amount of data from said second USB enabled device;
a unit to segment said amount of data into a plurality of transfer segments; and
a unit to transfer said plurality of transfer segments in a plurality of transfers to said USB enabled device;
wherein said segmenting includes dynamically and adaptively adjusting the size of at least one of said plurality of transfer segments to maximize throughput for a given situation.

15. The apparatus of claim 14, wherein said apparatus is configured as a device wire adapter.

16. The apparatus of claim 14,
wherein the second USB enabled device is configured as a device wire adapter, and
wherein the apparatus is configured as a host wire adapter.

17. The apparatus of claim 14, further comprising:
a unit to segment said amount of data into a plurality of transfer segments; and
a unit to transfer said plurality of transfer segments in a plurality of transfers to said USB enabled device.

18. The apparatus of claim 17, wherein said plurality of transfer segments vary in size based at least in part on said availability of said data buffer determined at said apparatus.

19. A communication apparatus, the apparatus comprising:
a list having a plurality of entries, each entry corresponding to a pending transfer request packet;
a unit configured to forward a first transfer request packet to a target wire adapter, the first transfer request packet including at least one pipe descriptor in a field indicating a forwarding transfer of the first transfer request packet;
a unit configured to add, in response to forwarding the first transfer request packet, an entry to said list, wherein the entry corresponds to the first transfer request packet; and
a unit configured to poll said target wire adapter for a transfer result packet based on said entry that corresponds to the first transfer request packet, said transfer result packet indicating that a data transfer is complete.

20. The apparatus of claim 19, further comprising a unit configured to delete the entry corresponding to the first transfer request packet in response to receiving the transfer result packet.

21. The apparatus of claim 19, wherein the unit configured to poll said target wire adapter for said transfer result packet only polls while said first transfer request packet is indicated in said list, and further comprising a unit configured to delete the entry corresponding to the first transfer request packet after receiving the transfer result packet.

22. An apparatus for increasing throughput in a wireless universal serial bus (USB) system, the apparatus comprising:
means for storing a plurality of entries, each entry corresponding to a pending transfer request packet;
means for forwarding a first transfer request packet to a target wire adapter, the first transfer request packet including at least one pipe descriptor in a field indicating a forwarding transfer of the first transfer request packet;
means for storing, in response to forwarding the first transfer request packet, an entry corresponding to the first transfer request packet in the storing means; and
means for polling said target wire adapter for a transfer result packet based on said entry corresponding to the first transfer request packet, said transfer result packet indicating that a data transfer is complete.

23. A wire adapter, comprising:
an antenna;
a unit configured to send a transfer request packet via said antenna, wherein the transfer request packet is associated with a bulk transfer;
changing at least one pipe descriptor in a field value in the transfer request packet to indicate a forwarding transfer of the transfer request packet;
a unit configured to poll, in response to sending the transfer request packet, a second wire adapter for a transfer result packet associated with the bulk data transfer using a plurality of communications by issuing tokens, said transfer result packet indicating that said bulk data transfer is complete;
a downstream interface configured to receive said transfer result packet via said antenna from said second wire adapter subsequent to polling using said plurality of communications;
an upstream interface configured to send data to an upstream device; and
a unit configured to forward said transfer result packet to the upstream interface after said transfer result packet is received by said downstream interface.

24. A wire adapter, comprising:
an antenna;

a list having a plurality of entries, each entry corresponding to a pending transfer request;
a unit configured to forward via said antenna a first transfer request packet to a second wire adapter, the first transfer request packet including at least one pipe descriptor in a field indicating a forwarding transfer of the first transfer request packet;
a unit configured to add an entry to said list in response to forwarding the first transfer request packet, wherein the entry corresponds to the first transfer request packet; and
a unit configured to poll said second wire adapter for a transfer result packet based on said entry that corresponds to the first transfer request packet, said transfer result packet indicating that a data transfer is complete.

25. A method for increasing throughput for a wireless universal serial bus (USB) system, the method comprising:
aggregating a first packet with a second packet at a first USB enabled device, wherein the first packet comprises a control packet, wherein the second packet comprises a data packet, and wherein the data packet is preceded by the control packet,
changing at least one pipe descriptor in a field value in the first packet to indicate a forwarding transfer for the first and second packets;
said first USB enabled device having a plurality of software driver layers to enable communication among various USB enabled devices of the USB system;
said control packet associated with a particular one of said various USB enabled devices;
transferring said aggregated packets in a single transfer from said first USB enabled device over a wire connection through the plurality of software driver layers to a second USB enabled device;
disaggregating said aggregated packets at said second USB enabled device after said transferring;
sending a transfer result packet from said second USB enabled device to said first USB enabled device, the transfer result packet corresponding to the transferred aggregated packets; and
controlling data receipt acknowledgements such that said control packet is not seen as data by, and therefore does not invoke data receipt acknowledgement from, the plurality of software driver layers other than a software driver layer of said particular one of said various USB enabled device.

26. A method for increasing throughput for a wireless universal serial bus (USB) system, the method comprising:
generating, at a USB enabled device, transfer request packet including a first transfer ID value to be forwarded by a first wire adapter to a second wire adapter, wherein said transfer request packet indicates an amount of data to be transferred to said second wire adapter, and wherein said transfer request packet comprises a descriptor indicating a data transfer type and comprises at least one pipe descriptor in a field indicating a forwarding transfer of the transfer request packet;
replacing, by a second driver at the USB enabled device, the first transfer ID value in said transfer request packet with a second transfer ID value corresponding to the second wire adapter;
sending said transfer request packet to said first wire adapter;
identifying, at said first wire adapter, said transfer request packet as a transfer request packet to be forwarded to said second wire adapter; and
forwarding said transfer request packet including said second transfer ID value from said first wire adapter to said second wire adapter based on said descriptor.

27. The method of claim 26, including forwarding a transfer data packet along with said transfer request packet when said data transfer type is an OUT transfer.

28. A wire adapter, comprising:
a data buffer;
a unit configured to receive a transfer request packet via a wired interface from a universal serial bus (USB) enabled device, wherein said transfer request packet indicates an amount of data to be transferred to the USB enabled device and comprises at least one pipe descriptor a field indicating a forwarding transfer of the transfer request packet;
a unit configured to determine that the data buffer is available to receive a segment of said amount of data;
a unit configured to generate a message based on said availability of said data buffer;
an interface configured to provide said message to a second USB enabled device indicating that said data buffer is available to receive said segment from the second USB enabled device; and
an antenna configured to transmit said segment.

* * * * *